US00RE50822E

(19) United States
(12) Reissued Patent
Goodrich et al.

(10) Patent Number: US RE50,822 E
(45) Date of Reissued Patent: Mar. 17, 2026

(54) FRONT LIGHT OF A VEHICLE

(71) Applicant: Rivian IP Holdings, LLC, Irvine, CA (US)

(72) Inventors: Stephen Goodrich, Clawson, MI (US); Paul Hoste, White Lake, MI (US)

(73) Assignee: Rivian IP Holdings, LLC, Irvine, CA (US)

(21) Appl. No.: 29/835,811

(22) Filed: Apr. 21, 2022

Related U.S. Patent Documents

Reissue of:
(64) Patent No.: Des. 882,131
Issued: Apr. 21, 2020
Appl. No.: 29/669,980
Filed: Nov. 13, 2018

(51) LOC (15) Cl. ..... 26-06
(52) U.S. Cl.
USPC ..... D26/28
(58) Field of Classification Search
USPC ..... D26/28–36
(Continued)

(56) References Cited

U.S. PATENT DOCUMENTS

D637,746 S * 5/2011 Kong ..... D26/28
D684,711 S * 6/2013 Chen ..... D26/28
(Continued)

OTHER PUBLICATIONS

"2022 Rivian R1S first drive review: An EV SUV fit for an expedition or a drag race." Digital Trends., Jul. 6, 2022 [online], [retrieved on Mar. 12, 2024]. Retrieved from the Internet <URL: https://www.digitaltrends.com/cars/2022-rivian-r1s-review/>.
(Continued)

*Primary Examiner* — Darlington Ly

(74) *Attorney, Agent, or Firm* — Haley Guiliano LLP

(57) CLAIM

The ornamental design for *a* front [lights] *light* of a vehicle, as shown and described.

DESCRIPTION

FIG. 1 is a front view of *a* front [lights] *light* of a vehicle showing *an embodiment of* the claimed design;
FIG. 2 is a top view of the front [lights] *light* of the vehicle *shown in FIG. 1*;
FIG. 3 is a bottom view of the front [lights] *light* of the vehicle *shown in FIG. 1*;
FIG. 4 is an enlarged left-side view of the front [lights] *light* of the vehicle *shown in FIG. 1*(both the left-side and right-side views being mirror images);
FIG. 5 is a front corner perspective view of the front [lights] *light* of the vehicle *shown in FIG. 1*;
FIG. 6 is a front downwards perspective view of the front [lights] *light* of the vehicle *shown in FIG. 1*; [and,]
FIG. 7 is a front upwards perspective view of the front [lights] *light* of the vehicle *shown in FIG. 1.*
*FIG. 8 is a front view of a front light of a vehicle showing an embodiment of the claimed design;*
*FIG. 9 is a top view of the front light of the vehicle shown in FIG. 8;*
*FIG. 10 is a bottom view of the front light of the vehicle shown in FIG. 8;*
*FIG. 11 is an enlarged left-side view of the front light of the vehicle shown in FIG. 8;*
*FIG. 12 is a front corner perspective view of the front light of the vehicle shown in FIG. 8;*
*FIG. 13 is a front downwards perspective view of the front light of the vehicle shown in FIG. 8; and,*
*FIG. 14 is a front upwards perspective view of the front light of the vehicle shown in FIG. 8.*
(Continued)

*The dashed broken lines represent boundaries of the design; the dashed broken lines themselves and the areas within form no part of the claimed design.*

1 Claim, 14 Drawing Sheets

Figure 1:
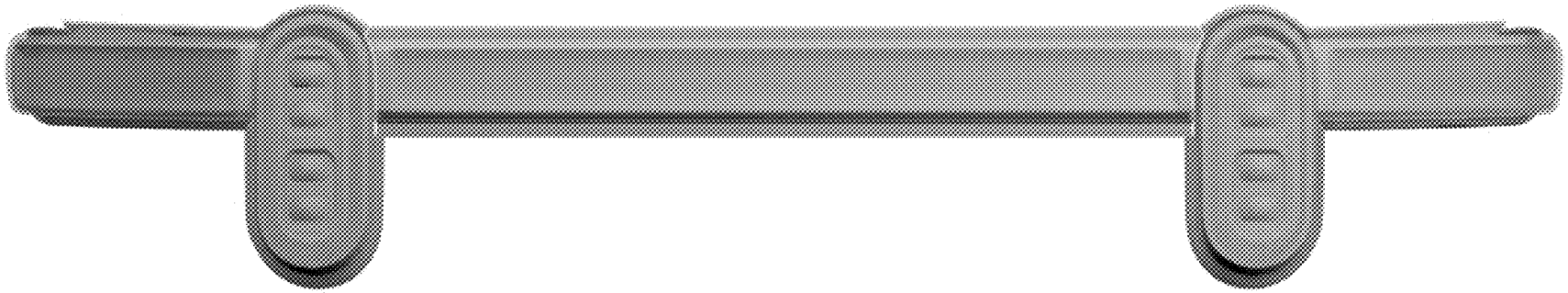
Figure 2:
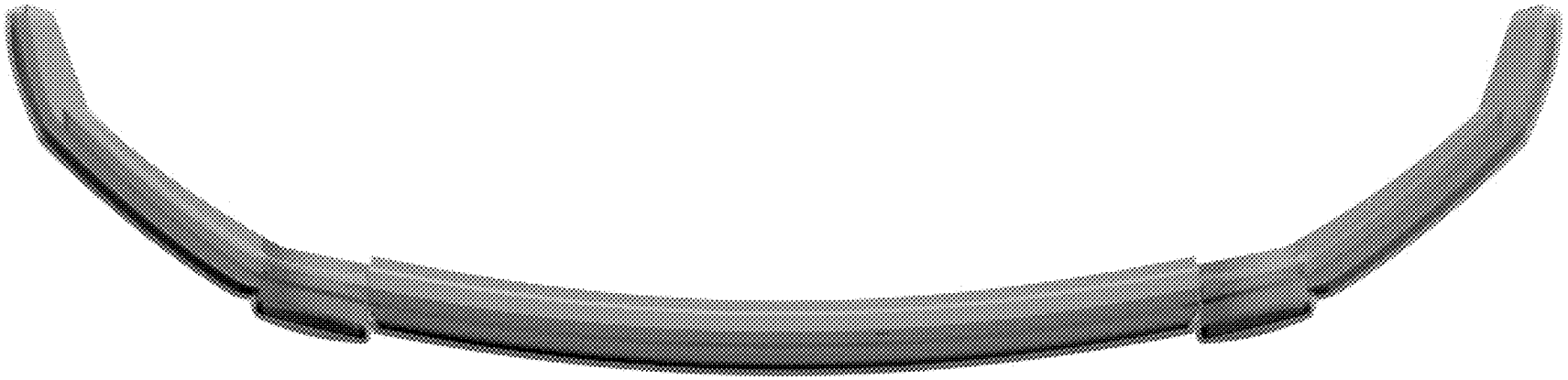
Figure 3:
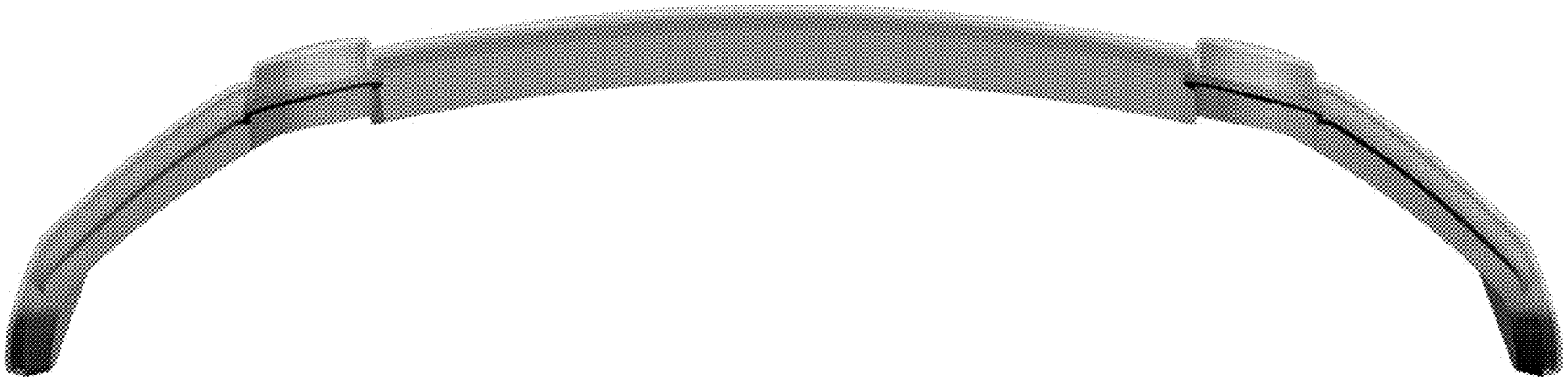
Figure 4:
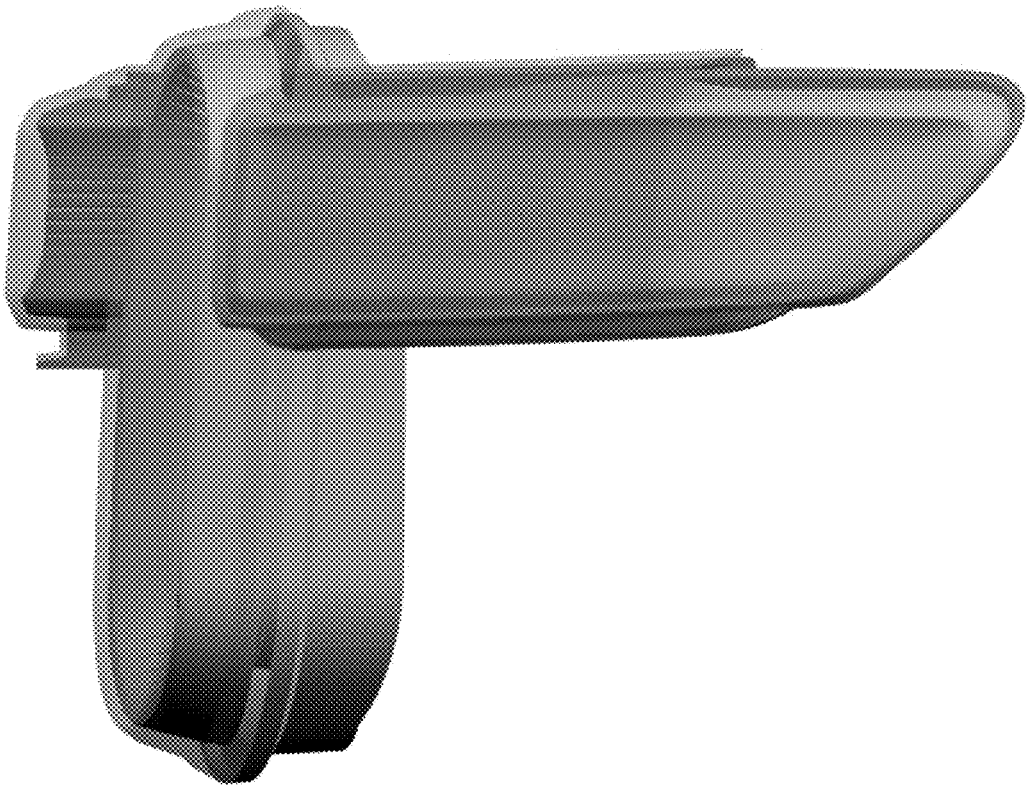
Figure 5:
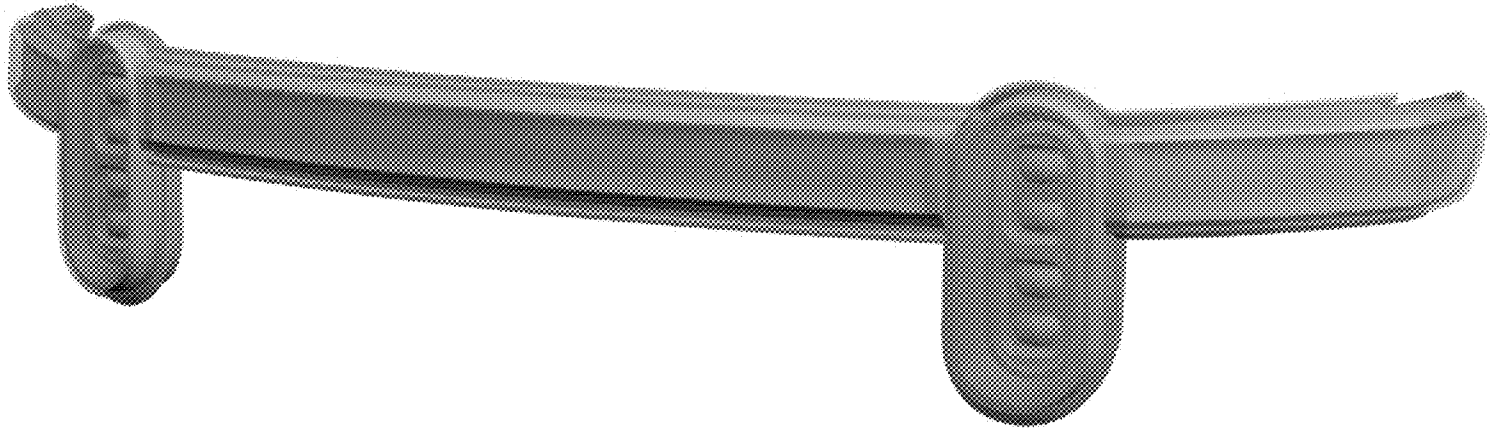
Figure 6:
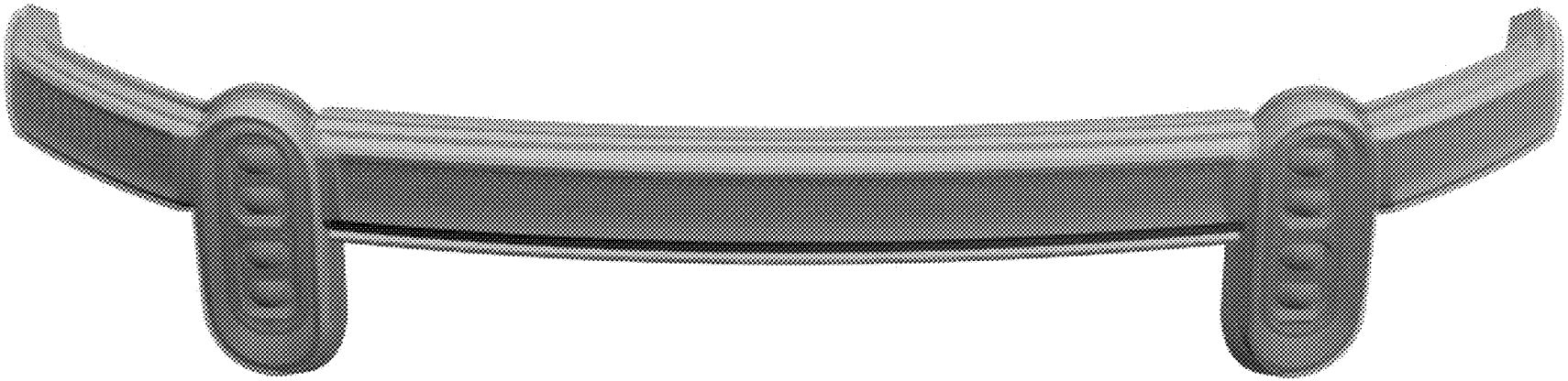
Figure 7:
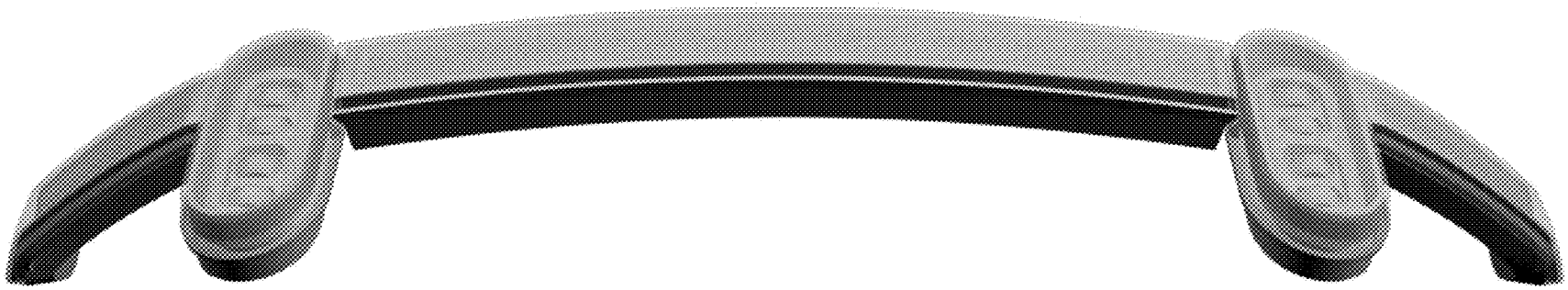

Matter enclosed in heavy brackets [ ] appears in the original patent but forms no part of this reissue; matter printed in italics indicates the additions made by reissue.

(58) Field of Classification Search
CPC . B60R 19/50; F21S 4/28; F21V 21/04; B60Q 1/18; B60Q 1/2696; B60Q 1/0035; B60Q 1/0483
See application file for complete search history.

(56) References Cited

U.S. PATENT DOCUMENTS

D743,588 S * 11/2015 Wolff ..... D26/28
D780,961 S * 3/2017 Curic ..... D26/28
D791,375 S * 7/2017 Lichte ..... D26/28
D795,472 S * 8/2017 Leutiger ..... D26/28
D802,183 S * 11/2017 Leutiger ..... D26/28
10,259,377 B2 * 4/2019 Kennemer ..... F21S 41/331
D882,131 S * 4/2020 Goodrich ..... D26/28
D953,587 S * 5/2022 Leang ..... D26/35
D957,011 S * 7/2022 Caussimon ..... D26/28
D958,419 S * 7/2022 Caussimon ..... D26/28
D964,613 S * 9/2022 Jeong ..... D26/28
D969,365 S * 11/2022 Caussimon ..... D26/28
D979,819 S * 2/2023 Wu ..... D26/36
2019/0126809 A1 * 5/2019 Wymore ..... B60R 19/50

OTHER PUBLICATIONS

"Rivian Shows Off The First Delivered R1S." Inside EVs., Dec. 21, 2021 [online], [retrieved on Mar. 12, 2024]. Retrieved from the Internet <URL: https://insideevs.com/news/555919/rivian-shows-first-delivered-r1s/>.
"The Rivian R2 Looks Like a Rivian R1 in a New Teaser." Road and Track., Feb. 16, 2024 [online], [retrieved on Mar. 12, 2024]. Retrieved from the Internet <URL: https://www.roadandtrack.com/news/a46803205/rivian-r2-looks-like-rivian-r1-teaser/>.

* cited by examiner

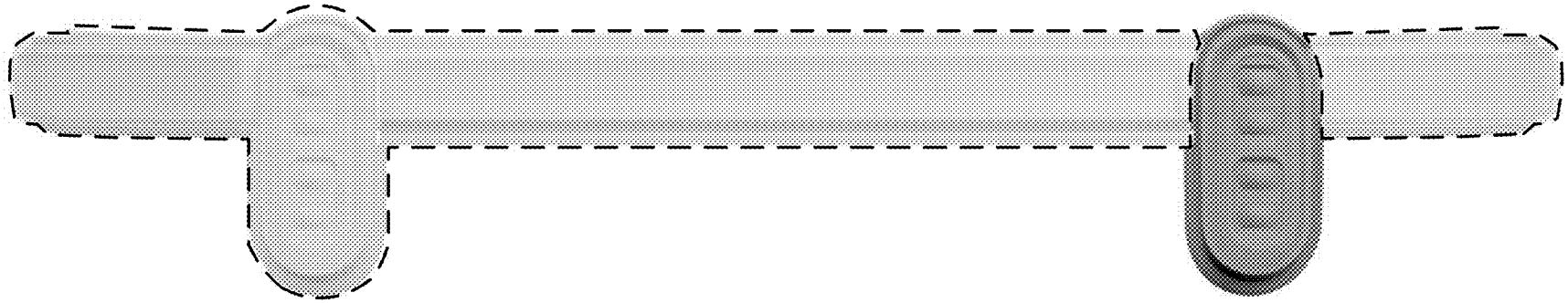
FIG. 8 (NEW)

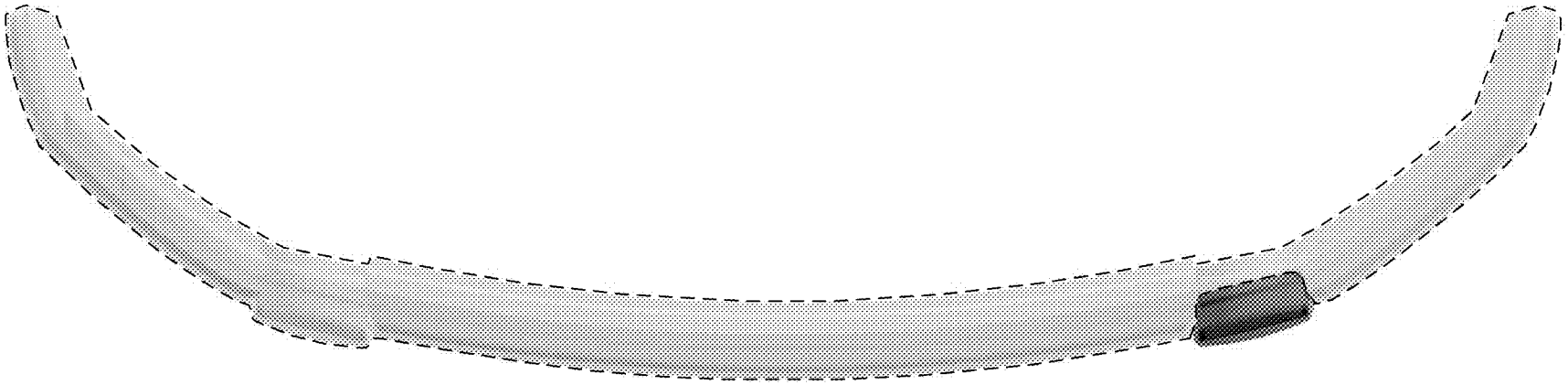
FIG. 9 (NEW)

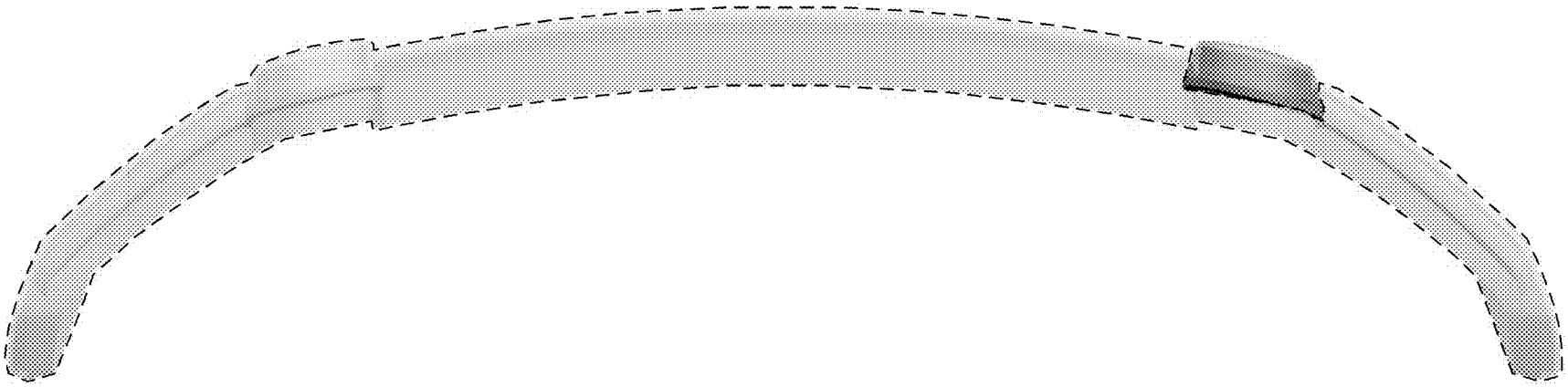
FIG. 10 (NEW)

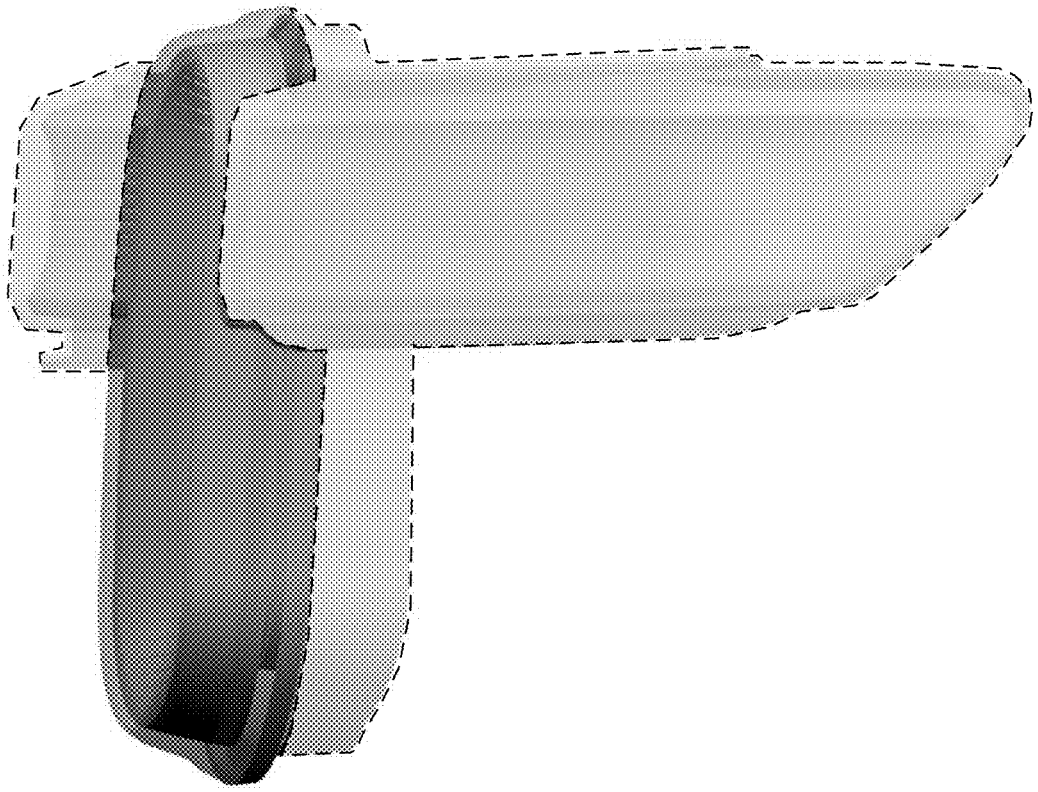
FIG. 11 (NEW)

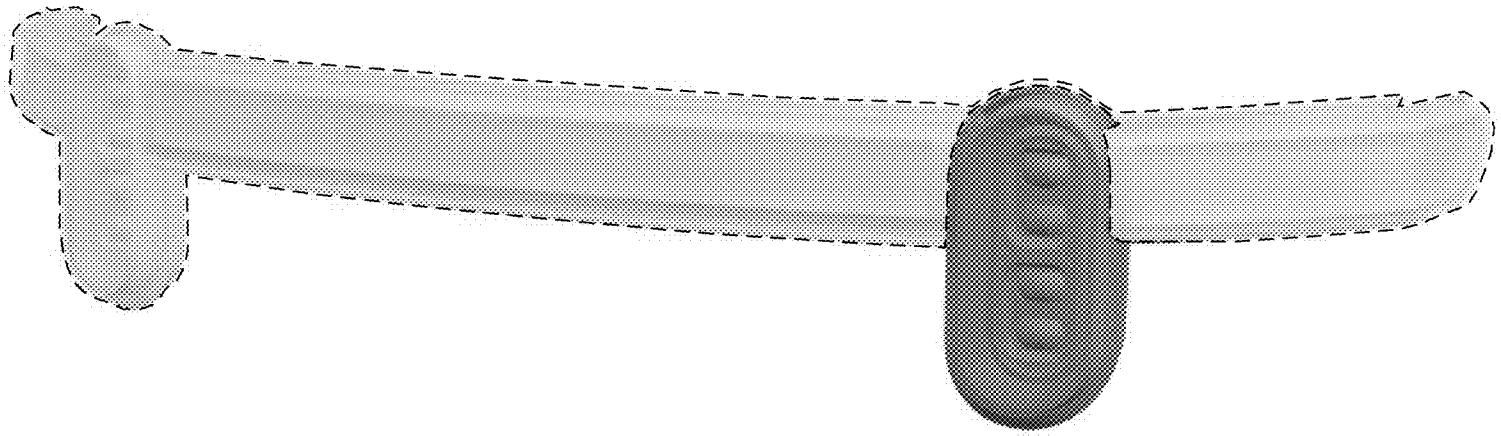
FIG. 12 (NEW)

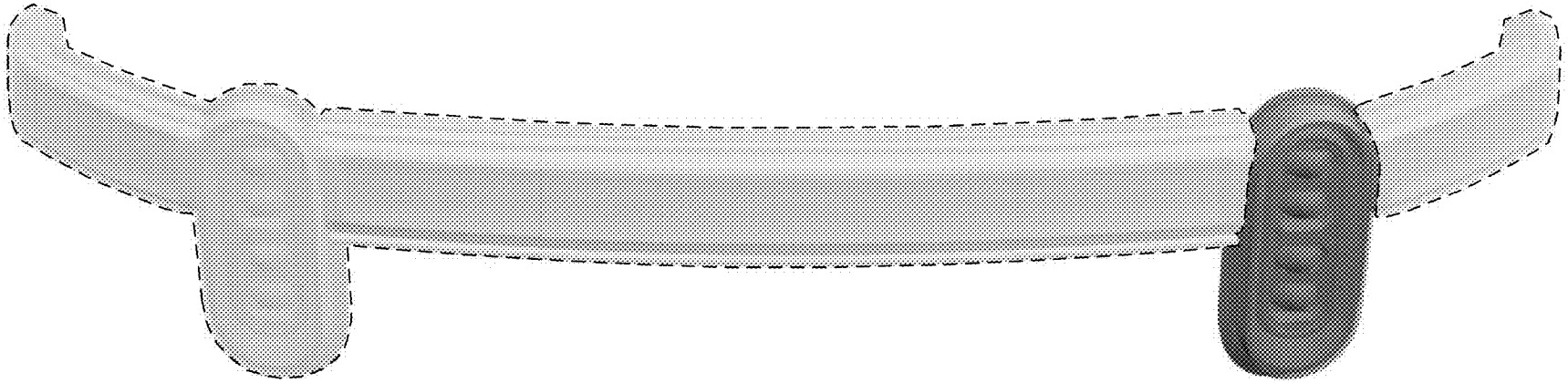
FIG. 13 (NEW)

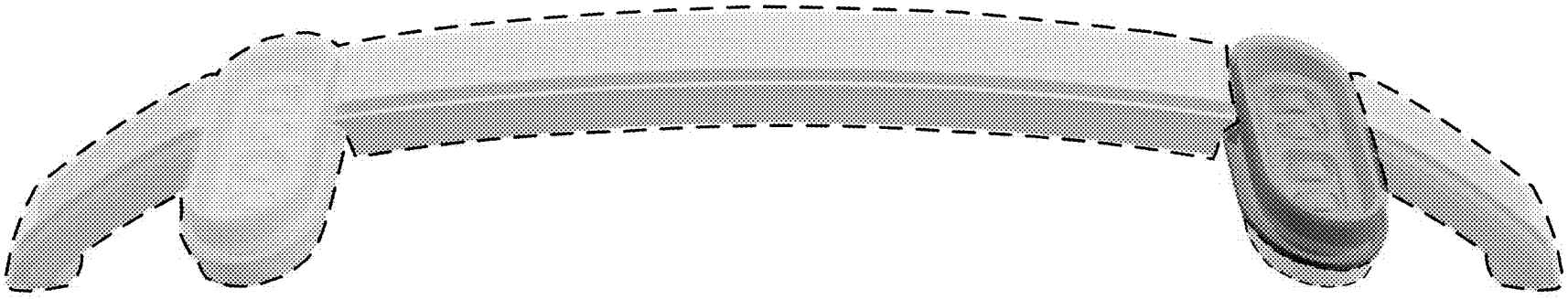
FIG. 14 (NEW)